(12) United States Patent
Abu-Shanab et al.

(10) Patent No.: US 8,871,309 B2
(45) Date of Patent: Oct. 28, 2014

(54) OFF-WHITE AND GRAY AUTODEPOSITION COATINGS

(75) Inventors: Omar Lufti Abu-Shanab, Rochester Hills, MI (US); Bashir Ahmed, Rochester, MI (US); Manesh Nadupparambil Sekharan, Midland, MI (US); William E. Fristad, Rochester, MI (US); Nicholas Herdzik, Ferndale, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/465,409

(22) Filed: May 7, 2012

(65) Prior Publication Data

US 2013/0004782 A1 Jan. 3, 2013

Related U.S. Application Data

(60) Division of application No. 11/857,182, filed on Sep. 18, 2007, now Pat. No. 8,313,570, which is a continuation of application No. PCT/US2007/020186, filed on Sep. 18, 2007.

(60) Provisional application No. 60/845,322, filed on Sep. 18, 2006.

(51) Int. Cl.
*C23C 22/48* (2006.01)
*C23C 22/00* (2006.01)

(52) U.S. Cl.
USPC .......... 427/435; 106/14.11; 106/14.41; 106/14.43; 148/243; 148/244; 148/251; 148/271

(58) Field of Classification Search
USPC ......... 106/14.11, 14.41, 14.43; 148/243, 244, 148/251, 271; 427/435
See application file for complete search history.

(56) References Cited

U.S. PATENT DOCUMENTS

| | | | |
|---|---|---|---|
| 3,592,699 | A | 7/1971 | Steinbrecher et al. |
| 3,825,438 | A | 7/1974 | Pritchard et al. |
| 4,108,817 | A | 8/1978 | Lochel, Jr. |
| 4,177,180 | A | 12/1979 | Hall |
| 4,178,400 | A | 12/1979 | Lochel, Jr. |
| 4,180,603 | A | 12/1979 | Howell, Jr. |
| 4,242,379 | A | 12/1980 | Hall et al. |

(Continued)

FOREIGN PATENT DOCUMENTS

| | | |
|---|---|---|
| EP | 01270686 A2 | 1/2003 |
| JP | 2003128876 A | 5/2003 |

(Continued)

OTHER PUBLICATIONS

International Search Report, PCT/US2007/020186, mailed Jan. 25, 2008, 2 pages All references cited in the International Search Report are listed herein.

(Continued)

*Primary Examiner* — Lois Zheng
(74) *Attorney, Agent, or Firm* — Mary K. Cameron

(57) ABSTRACT

A method for coating a metal substrate with a white to off-white or gray colored autodeposited coating comprising water, polymeric resin, HF and pigment particles comprising a core of titanium dioxide, an intermediate zirconia and/or alumina layer, and an outer organic layer, optionally the particles are treated with an anionic surfactant.

23 Claims, 1 Drawing Sheet

(56) References Cited

U.S. PATENT DOCUMENTS

| | | | |
|---|---|---|---|
| 4,243,704 | A | 1/1981 | Hall et al. |
| 4,289,826 | A | 9/1981 | Howell, Jr. |
| 5,342,694 | A | 8/1994 | Ahmed et al. |
| 5,412,019 | A | 5/1995 | Roulstone et al. |
| 5,500,460 | A | 3/1996 | Ahmed et al. |
| 5,760,112 | A | 6/1998 | Hirota et al. |
| 5,824,424 | A | 10/1998 | Haneishi et al. |
| 6,096,806 | A | 8/2000 | Mueller et al. |
| 6,559,204 | B1 * | 5/2003 | Agarwal .................. 523/218 |
| 6,596,071 | B2 | 7/2003 | Hayashi et al. |
| 6,645,633 | B2 | 11/2003 | Weller et al. |
| 7,037,385 | B2 | 5/2006 | Kucera et al. |
| 7,138,444 | B2 | 11/2006 | McGee et al. |
| 2002/0011309 | A1 | 1/2002 | Agarwal et al. |
| 2003/0212181 | A1 | 11/2003 | Honda et al. |
| 2005/0252782 | A9 * | 11/2005 | Williams et al. ............. 205/137 |
| 2006/0162820 | A1 | 7/2006 | Dietsche et al. |
| 2008/0069960 | A1 | 3/2008 | Abu-Shanab et al. |

FOREIGN PATENT DOCUMENTS

| | | | |
|---|---|---|---|
| JP | 2004018311 | A | 1/2004 |
| JP | 2006131715 | A | 5/2006 |
| WO | 9105023 | A1 | 4/1991 |
| WO | 0017269 | A1 | 3/2000 |
| WO | 0043131 | A2 | 7/2000 |

OTHER PUBLICATIONS

Bestimmung der Mahlfeinheit (Koernigkeit); (ISO 1524:1983) Deutsche Fassung EN 21 524:1991, 10 pages cited in corresponding U.S. Appl. No. 13/292,332, filed Nov. 9, 2011, on p. 15 of specification.

Millennium Inorganic Chemicals, "Tiona 595 Slurry".

Millennium Inorganic Chemicals, "Tiona 595".

International Search Report, PCT/EP2010/055661, mailed Jul. 1, 2010, 3 pages All references cited in the International Search Report are listed herein.

EP Communication, EP 07838403.9-1217, dated Dec. 15, 2009, 5 pages All references cited in the EP Communication are listed herein.

Supplementary European Search Report, EP 07838403, dated Oct. 21, 2009, 5 pages All references cited in the Supplementary European Search Report are listed herein.

Written Opinion, PCT/US2007/020186, mailed Jan. 25, 2008, 4 pages All references cited in the Written Opinion are listed herein.

Surfactants Derived from Naphthalene, Jiao Xue-shun, China Surfactant Detergent & Cosmetics, 2000, vol. 3, pp. 29-33 (English abstract on last page).

Synthesis, Structure and Hydration of Sodium Dioleyl Sulfosuccinate, Yu Yan-Chun et al, Acta Phys.-Chim.Sin., 2009, 25(1), pp. 31-34 (with English abstract).

* cited by examiner

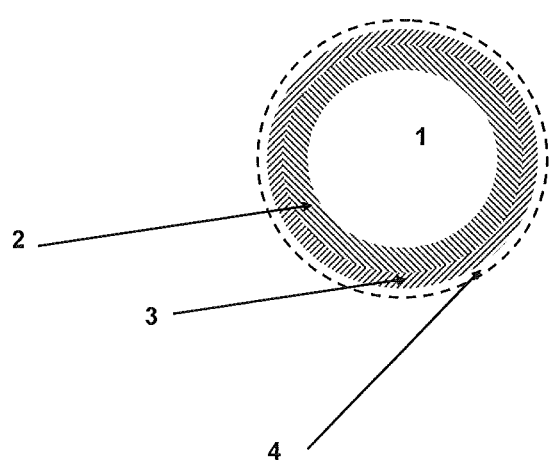

OFF-WHITE AND GRAY AUTODEPOSITION COATINGS

CROSS REFERENCE TO RELATED APPLICATIONS

This divisional application claims priority to U.S. patent application Ser. No. 11/857,182, filed Sep. 18, 2007, which claims priority from the U.S. Provisional Application Ser. No. 60/845,322, filed Sep. 18, 2006.

FIELD OF THE INVENTION

This invention relates to compositions and processes for generating pigmented polymeric coatings on metal substrates by chemical reaction between the metal and an autodeposition coating bath using pigment particles, which have been stabilized against the autodeposition bath, instead of or in addition to conventional carbon black particles. More particularly, the invention relates to white to off-white and gray coatings generated by an autodeposition coating bath, as well as processes of depositing the coatings, the autodeposition coating baths themselves, concentrates for forming the baths.

BACKGROUND OF THE INVENTION

Autodeposition has been in commercial use on steel for about thirty years and is now well established for that use. For details, see for example, U.S. Pat. No. 3,592,699 (Steinbrecher et al.); U.S. Pat. Nos. 4,108,817 and 4,178,400 (both to Lochel); U.S. Pat. No. 4,180,603 (Howell. Jr.); U.S. Pat. Nos. 4,242,379 and 4,243,704 (both to Hall et al.); U.S. Pat. No. 4,289,826 (Howell, Jr.); and U.S. Pat. No. 5,342,694 (Ahmed) as well as U.S. Pat. No. 5,500,460 (Ahmed et al.) and U.S. Pat. No. 6,645,633 (Weller et al.). The disclosures of all of these patents are hereby incorporated by reference.

Autodeposition compositions are usually in the form of liquid, usually aqueous, solutions, emulsions or dispersions in which active metal surfaces of inserted objects are coated with an adherent resin or polymer film that increases in thickness the longer the metal object remains in the bath, even though the liquid is stable for a long time against spontaneous precipitation or flocculation of any resin or polymer, in the absence of contact with active metal. "Active metal" is defined as metal that is more active than hydrogen in the electromotive series, i.e., that spontaneously begins to dissolve at a substantial rate (with accompanying evolution of hydrogen gas) when introduced into the liquid solution, emulsion or dispersion. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods, or a like term. Autodeposition is often contrasted with electrodeposition, which can produce very similar adherent films but requires that metal or other objects to be coated be connected to a source of direct current electricity for coating to occur. No such external electric current is used in autodeposition, instead an accelerator is used.

The autodeposition accelerator component is a substance such as an acid, oxidizing agent, and/or complexing agent capable of causing the dissolution of active metals from active metal surfaces in contact with the autodeposition composition thereby driving the coating deposition. The autodeposition accelerator component can be chosen from the group consisting of hydrofluoric acid and its salts, fluosilicic acid and its salts, fluotitanic acid and its salts, ferric ions, acetic acid, phosphoric acid, sulfuric acid, nitric acid, hydrogen peroxide, peroxy acids, citric acid and its salts, and tartaric acid and its salts. The autodeposition accelerator component may be selected from any material or combination of materials known for this purpose in prior autodeposition art or otherwise found to give satisfactory results.

Autodeposition compositions typically may also contain one or more additional ingredients. Such additional ingredients may include surfactants (emulsifying or dispersing agents), fillers, biocides, foam control agents, flow control (leveling) agents, and/or carbon black pigments.

Autodeposition coatings, in the absence of pigment, tend to be colorless or slightly yellow to green, and do not provide adequate hiding power for many commercial uses. Adding pigment is a conventional way to increase hiding power of coatings. Introducing pigment into autodeposition baths has proven to be problematic due to the strongly acidic nature of the baths, which have a pH ranging from 1.0 to 4.0. Previously, autodeposition coatings have been limited to black color, using so called "carbon black" pigments that were stable in acid and dispersible in the working bath.

Conventional pigments are adapted for use in paints, which typically have a pH ranging from 5.5 to 10. The significant difference in pH between paint and autodeposition baths has limited the pigments that can be used in autodeposition baths due to the lack of pigments that are predictably stable in acidic autodeposition baths. Attempts to introduce a non-carbon black pigment into autodeposition to produce a coating in colors other than black have up to now been unsuccessful due to unpredictable behaviors of various pigments, including dissolving into the bath, failing to deposit on the active metal substrate with the polymer, developing coatings that rinsed off of the active metal substrate, and reaction in the bath with other components resulting in "crashing" of the bath, as well as settling out of dispersion to form sludge on the tank bottom.

A particular problem in formulating a white or off-white autodeposition coating has been the limited stability of pigments in the autodeposition bath, which typically is subject to the periodic addition of oxidizing agents and contains strong acid. In particular, titanium dioxide ($TiO_2$), an economical and commonly used white pigment, is unstable in autodeposition bath chemistry due to the presence of hydrogen fluoride (HF). In the presence of HF, $TiO_2$ hydrolyzes to fluorotitanic acid and the bath becomes unstable. These changes to the titanium dioxide make it unavailable for deposition on metal substrates as a white pigment for generating white, off-white or gray coatings. Another drawback of prior attempts to use titanium dioxide particles alone has been that the particles do not remain dispersed and form sludge which requires disposal.

SUMMARY OF THE INVENTION

This invention relates to the use of aqueous liquid compositions (solutions or dispersions) with which active metal surfaces can be coated, by mere contact with the liquid composition, with an adherent white to off-white or gray polymer film that increases in thickness the longer the time of contact, even though the liquid composition is stable for a long time against spontaneous precipitation or flocculation of any solid polymer, in the absence of contact with active metal. (For the purposes of this application, the term "active metal" is to be understood as including iron and all the metals and alloys more active than iron in the electromotive series.) Such liquid compositions are denoted in this specification, and commonly in the art, as "autodeposition" or "autodepositing" compositions, dispersions, emulsions, suspensions, baths, solutions, or a like term.

It is an object of the invention to provide an autodeposition bath composition for use in coating an active metal surface comprising: an aqueous solution of an autodeposition accelerator comprising acid, in an amount such that the composition has a pH of about 1.6 to about 3.8, and at least one oxidizing agent; particles of a coating-forming polymeric material dispersed throughout the composition; a component of non-black solid pigment particles, stabilized against the acid, dispersed throughout the composition; an emulsifying component comprising anionic surfactant; optionally, a second stabilizing surfactant different from the emulsifying component; and, optionally, finely divided solids suitable as fillers and/or black pigment in the coatings to be formed from the composition; the composition being effective to chemically attack, in the absence of an external electrical potential, an active metal surface immersed therein to dissolve therefrom metal to release ions of the metal and sufficient to cause the polymeric material and the non-black solid pigment particles to deposit on the active metal surface in the form of an initially adherent coating which increases in weight or thickness the longer the time the surface is immersed in the composition.

It is a further object of the invention to provide a composition wherein the acid is hydrofluoric and the non-black solid pigment particles comprise a titanium dioxide core, a first coating of an inorganic material, desirably an oxide different from titanium dioxide and a second coating of an organic material. The first coating of an oxide may comprise oxides that are substantially insoluble in the acid. In one embodiment of the invention the oxides are selected from alumina, zirconia and mixtures thereof. It is a yet further object of the invention to provide a composition wherein the second coating of an organic material comprises an anionic dispersing additive, a cationic dispersing additives or a non-ionic dispersing additive.

In one embodiment of the invention, the second coating of an organic material comprises at least one of polyacrylates, polyphosphates, cationized polyacrylates, epichlorhydrine resins, dicyandiamide resins, polymethacrylates, polyether polyols and polyesters. In another embodiment, the polymethacrylates are selected from quaternary dimethylaminoethyl methacrylates, melamine-formaldehyde resins and mixtures thereof.

It is a further object of the invention to provide a composition wherein the weight ratio of the non-black solid pigment particles to the polymeric material ranges, in increasing order of preference, from about 1, 2.5, 5, 7.5, 10, 15, 20, 25, 26, 27, or 28 and is less than, in increasing order of preference, 50, 49, 48, 47, 46, 45, 44, 43, 42, 41, 40, 39, 38, 37, 36, 35, 34, 33, 32, or 31.

It is a further object of the invention to provide a composition wherein the anionic surfactant is selected from surfactants having at least one sulfate, sulphonate, phosphate, or phosphonate functional group.

It is a further object of the invention to provide a composition wherein the anionic surfactant maintains dispersion of the particles of a coating-forming polymeric material, and the component of non-black solid pigment particles, such that the polymeric material and the pigment particles deposit on the active metal surface in the form of an initially adherent coating.

It is another object of the invention to provide a composition wherein the composition comprises an amount of black pigment sufficient to provide a gray coating formed from the composition.

It is a further object of the invention to provide a composition wherein the polymeric material is selected from the group consisting of styrene-butadiene, acrylonitrile-butadiene, polyethylene, acrylic, tetrafluoroethylene, polyvinyl chloride, urethane resins, styrene-acrylic, epoxy, and epoxy-acrylic materials.

It is a further object of the invention to provide a composition wherein the oxidizing agent is selected from the group consisting of hydrogen peroxide, dichromate, perborate, bromate, permanganate, nitrite, nitrate and chlorate.

It is a further object of the invention to provide a composition wherein the acid is selected from the group consisting of hydrofluoric, sulfuric, hydrochloric, nitric, phosphoric, hydrobromic, hydroiodic, acetic, chloroacetic, trichloroacetic, lactic, tartaric and polyacrylic.

It is another object of the invention to provide a method of depositing a white to off-white or gray autodeposition coating on an active metal substrate surface comprising:
contacting an active metal substrate surface for 0.5 to 10 minutes, with a composition according to any one of claims 1 to 15 to form a white to off-white or gray initially adherent coating on the surface;
rinsing the initially adherent coating with a rinse comprising water;
optionally, drying the initially adherent coating; and
curing the initially adherent coating to form a cured, white to off-white or gray coating.

It is another object of the invention to provide an aqueous autodeposition concentrate composition for use in forming an autodeposition bath comprising:
particles of a coating-forming polymeric material dispersed throughout the composition;
non-black solid pigment particles comprising a titanium dioxide core, a first coating of an oxide different from titanium dioxide and a second coating of an organic material, the particles dispersed throughout the composition;
an emulsifying component comprising anionic surfactant;
optionally a second stabilizing surfactant different from the emulsifying component; and
optionally finely divided solids suitable as fillers and/or carbon black pigment in the coatings to be formed from the composition;
wherein the weight ratio of the non-black solid pigment particles to the polymeric material ranges from 1-49% by weight.

Except in the operating examples, or where otherwise explicitly indicated, all numerical quantities in this description indicating amounts of material or reaction conditions are to be understood as modified by the word "about".

BRIEF DESCRIPTION OF THE DRAWINGS

FIG. 1 depicts a cross-sectional view of one type of titanium dioxide pigment useful in the invention.

DETAILED DESCRIPTION OF EMBODIMENTS

Applicants have developed a white to off-white or gray colored autodeposition coating suitable for use as a stand alone coating or as a primer for general industrial application that comprises titanium dioxide pigment particles either alone or in combination with black pigment, such as carbon black. The instability of autodeposition concentrates and baths using ordinary titanium dioxide pigment particles has been overcome by developing a new autodepositing bath composition having titanium dioxide particles that have been stabilized against the bath.

The first difficulty encountered in making a stable titanium dioxide autodeposition coating bath was the instability of the titanium dioxide particle in the acidic environment of the autodeposition bath. In the absence of any additional outer coating layer, such as an organic layer, deposited on titanium dioxide particles, the acidity of the autodeposition bath will dissolve or hydrolyze the titanium dioxide. In particular hydrofluoric acid will react with titanium dioxide to generate fluorotitanic acid.

Autodeposition baths contain an accelerator component that desirably comprises ferric cations, hydrofluoric acid, and hydrogen peroxide. In a working composition according to the invention, independently for each constituent: the concentration of ferric cations preferably is at least, with increasing preference in the order given, 0.5, 0.8, or 1.0 g/l and independently preferably is not more than, with increasing preference in the order given, 2.95, 2.90, 2.85, 2.80, or 2.75 g/l; the concentration of fluorine in anions preferably is at least, with increasing preference in the order given, 0.5, 0.8, 1.0, 1.2, 1.4, 1.50, 1.55, 1.60, 1.80, 2.0 g/l and independently preferably is not more than, with increasing preference in the order given, 20, 17, 15, 13, 12, 11, 10, 7.0, 5.0, or 4.0 g/l; and the amount of hydrogen peroxide added to freshly prepared working composition preferably is at least, with increasing preference in the order given, 0.050, 0.10, 0.20, 0.30, or 0.40 g/l and independently preferably is not more than, with increasing preference in the order given, 2.1, 1.8, 1.5, 1.2, 1.00, 0.90, or 0.80 g/l.

Preferably, an accelerator component is selected which is sufficient in strength and amount to impart to the autodeposition composition an oxidation-reduction potential, measured by the potential of a platinum or other inert metal electrode in contact with the autodepositing liquid composition, that is, with increasing preference in the order given, at least 150, 175, 200, 225, or 250 mV more oxidizing than a standard hydrogen electrode and independently preferably is, with increasing preference in the order given, not more than 550, 525, 500, 475, or 450 mV more oxidizing than a standard hydrogen electrode. Desirably the accelerator component also comprises a source of hydrogen cations, i.e. acid, in an amount sufficient to impart to the autodeposition bath a pH that is at least, with increasing preference in the order given, 1.0, 1.4, 1.6, 1.8, or 2.0 and independently preferably is not more than, with increasing preference in the order given, 3.8, 3.6, 3.2, 3.0, 2.8, or 2.6.

Typically titanium dioxide particles are stabilized with alumina and silica. Silica is unstable in HF, as to some extent is alumina in HF. Thus far, silica coated particles have not proven to be stable against HF; desirably, the coatings on the titanium dioxide particles comprise, in increasing order of preference, less than 30, 20, 10, 5, 4, 3, 2, 1 wt % silica. In testing titanium dioxide particles coated with alumina, aluminum leached from the titanium dioxide particles into the autodeposition bath to form aluminum fluoride. The aluminum leaching phenomenon was found to be correctable by increasing the amount of HF in the bath. In additional testing, zirconia either alone or combined with alumina was found to protect the titanium dioxide from the acidic environment of the autodeposition bath.

A second hurdle to producing a stable, white to off-white or gray autodeposition bath was maintaining titanium dioxide suspended in the aqueous autodeposition concentrates and baths, and ensuring the desired amount of deposition of both the polymer and the pigment particles. Desirably, in one embodiment there is relatively equal deposition between polymeric particles and pigment particles.

It was found that hydrophobicity/hydrophilicity of the titanium dioxide particles and hydrophobicity/hydrophilicity of the polymeric particles, relative to each other are variables in controlling whether titanium dioxide particles remain dispersed in the bath and deposit adherently on the active metal substrate to achieve the desired color.

The type of surfactant used and composition of the surfactant used for the polymeric particles affects the relative compatibility, thus the relative deposition rate, between polymeric and pigment particles. Without being bound by a single theory, it is hypothesized that hydrophobic polymeric particles used in conjunction with hydrophilic titanium dioxide particles caused surfactant in the autodeposition bath to migrate toward the emulsion particles leaving the titanium dioxide pigment deprived of surfactant and eventually causing the titanium dioxide particle to settle out of dispersion. Selection of a more hydrophilic surfactant results in more surfactant being available to aid in dispersing the pigment particles. Desirably, there is relatively equal partitioning of surfactant between the two particles and an equilibrium condition is maintained such that the dispersion of polymer particles and pigment particles is stable in the absence of active metal.

In some embodiments, the emulsifying component of anionic surfactant is sufficient to provide adequate stability to the anionically stabilized polymer particles and to the non-white solid pigment particles. Generally, the polymer particles in an autodeposition bath are anionically stabilized. This polymer stabilization may be achieved, as is known in the art, by either incorporating an anionic surfactant into the polymer or by adding anionic surfactant to the polymer emulsion. In some cases, both means are used. This emulsifying component comprising anionic surfactant may be sufficient to achieve stable dispersion and adequate deposition of the solid pigment particles in addition to the polymer particles.

In other embodiments, a second stabilizing surfactant may be included to further contribute to stable dispersion and adequate deposition of the solid pigment particles.

The surfactant package, meaning the emulsifying component and any second stabilizing surfactant different from the emulsifying component, should be selected and should be present in sufficient concentration to emulsify or disperse the polymer particles and disperse the pigment particles in the autodeposition composition so that no separation or segregation of bulk phases that is perceptible with normal unaided human vision occurs during storage at 25° C. for at least 24 hours after preparation of the autodeposition composition, in the absence of contact of the autodeposition composition with any active metal.

Anionic surfactants are generally preferred, although amphoteric as well as nonionic surfactants may also be utilized. Anionic surfactants useful in the present invention include anionic surfactant having sulfate, sulphonate, phosphate, or phosphonate end groups. In one embodiment, the anionic surfactant used for coating the titanium dioxide pigment particles and stabilizing the polymer particles is selected from alkoxylated ether sulfates, such as by way of non-limiting example, Polystep B-40; Rhodapex™ CO-128, -433, and -436 and Texapon™ E-12 and K-12.

Modified $TiO_2$ particles have been successfully tested in autodeposition baths for decomposition and ability to deposit on the metal substrate. Desirably, the modified titanium dioxide particles are sufficiently stable in acidic conditions generally found in the autodeposition bath; and, in a particular embodiment, are sufficiently stable in the presence of HF, such that the solid pigment particles remain available for deposition on the metal substrates placed in the autodeposition bath. It is believed that the particles do not hydrolyze, however levels of hydrolysis of the pigment particles which do not interfere with deposition and bath stability are acceptable.

Performance properties (chemical, photochemical and physical characteristics) are determined principally by at least the following features of pigment particles: the particle size of the pigment and the chemical composition of the surface of the pigment particles. The chemical composition of the surface of the $TiO_2$ particles is modified by coating them with an inorganic layer of a second material different from titanium dioxide.

Many commercial grades of $TiO_2$ have inorganic and in some cases organic surface treatments, not all of which are suitable for use in autodeposition baths. Inorganic surface modifiers most often used for titanium dioxide are precipitated coatings of alumina and silica. Applicants research has shown that, for use in autodeposition baths, it is desirable that the first layer comprise an inorganic material having low solubility in the acid used in the autodeposition bath, generally this is HF. Preferably, the inorganic material is substantially insoluble in the acid used in the autodeposition bath. As used herein, "substantially insoluble" means that the material has a solubility at ambient temperature of less than, in order of increasing preference, 0.5, 0.25, 0.1, 0.075, 0.05, 0.025, 0.01, 0.0075, 0.005, 0.0025, or 0.001 g/100 ml of the acid. Preferably, the inorganic layer is a metal oxide, such as by way of non-limiting example zirconia and/or alumina.

Once coated with a first layer, i.e. the inorganic layer, the pigment particles are coated with second layer that is an organic layer. Alternatively, the pigment particles may be simultaneously contacted with the inorganic and organic materials thereby forming a first inorganic layer and a second outer organic layer; or a composite coating may be formed.

Generally, components of the organic layer are selected from substances, known to those of skill in the pigment art, which are useful in dispersing solid pigment in an aqueous liquid medium, such as by way of non-limiting example, anionic additives, cationic additives and non-ionic additives that assist in dispersing the particles without interfering with deposition of the particles on metallic substrates during the autodeposition process.

Suitable anionic additives include for example polyacrylates or polyphosphates and the like; cationic additives include for example cationized polyacrylates or polymethacrylates, such as quaternary dimethylaminoethyl methacrylates or melamine-formaldehyde resins, epichlorhydrin resins, dicyandiamide resins and the like. Non-ionic additives include polyols and/or polyesters and the like. A number of other suitable coatings for pigments are recited in U.S. Pat. No. 3,825,438, incorporated herein by reference.

FIG. 1 is a cross-sectional view of a pigment particle useful in the invention. In this embodiment, pigment particles comprise a core of $TiO_2$ (1) coated with a mixed zirconia/alumina layer (2) followed by an outer organic layer (3), see FIG. 1. Optionally, the coated $TiO_2$ pigment may be subsequently treated with anionic surfactant that forms a third outer layer (4). Desirably the anionic surfactant is based on sulfate chemistry, that is has sulfate functional groups, to promote uniform deposition and consumption rate of the pigment particles to that of the polymer emulsion particles.

The inner first inorganic layer and second organic layer surface treatment of the $TiO_2$ core in conjunction with the post treatment with anionic surfactant provides a stable and depositable $TiO_2$ pigment slurry in the acidic HF containing autodeposition baths. With the successful incorporation of the modified $TiO_2$ particles into the autodeposition bath, the autodeposition coating process provides coatings in the traditional black, white to off-white, and in shades of gray. The color of the coating is a function of the amount of conventional black pigment used in conjunction with the titanium dioxide pigment.

Autodeposition coatings comprising modified $TiO_2$ particles deposited from autodeposition baths containing these particles have been tested and displayed corrosion resistance and physical performance similar to the black commercial counterpart. Panels coated in baths having different amounts of modified $TiO_2$ particles coat metal substrates with a polymeric coating in uniform shades of white to gray. The resulting coated panels showed consistency in the compositions' performance in color, hiding power, and tinting strength.

One embodiment of the invention provides a composition for depositing an aqueous off-white autodeposition coating comprising: modified $TiO_2$ particles and at least one emulsion polymer. Desirably the modified $TiO_2$ particles are provided as an aqueous slurry to aid in incorporation of the component into the composition. Optionally, the $TiO_2$ slurry is further modified with anionic surfactant, desirably based on sulfate, sulphonate, phosphate, or phosphonate end groups. Alternatively, anionic surfactant and the slurry containing the modified $TiO_2$ particles can be added separately to the bath. The emulsion polymer(s) can be acrylic, styrene-acrylic, epoxy, epoxy-acrylic, polyurethane dispersion, or any other water dispersible ionically stabilized polymers suitable for use in autodeposition processes, as are known to those skilled in the art.

Another embodiment of the invention provides an aqueous composition suitable for depositing gray autodeposition coatings on metal substrates comprising: modified $TiO_2$ pigment particles, black pigment particles, preferably carbon black, and at least one emulsion polymer. Desirably, both pigments are provided as aqueous slurries to aid in incorporation into the composition and the carbon black slurry is anionically stabilized. Optionally, the $TiO_2$ slurry is further modified with anionic surfactant, desirably based on sulfate, sulphonate, phosphate, or phosphonate end groups. Alternatively, anionic surfactant and the slurry containing the modified $TiO_2$ particles can be added separately to the bath. The emulsion polymer(s) can be acrylic, styrene-acrylic, epoxy, epoxy-acrylic, polyurethane dispersion, or any other water dispersible ionically stabilized polymers suitable for use in autodeposition processes, as are known to those skilled in the art.

In another aspect of the invention, autodeposition coating baths are prepared by mixing one of the above-described autodeposition compositions with water, HF, iron and hydrogen peroxide in amounts sufficient to form an autodeposition bath wherein the percent of non-volatiles is in the range of 1-20 weight %.

The practice of this invention may be further appreciated from the following working examples.

EXAMPLE 1

A 35% non-volatile, off-white autodeposition coating composition concentrate was formulated as follows:

To a 1.5 liter container, were added 211.65 g of deionized water, 5.63 g of anionic surfactant having 20% non-volatile (active), 786.4 g of anionically modified polymer emulsion having 42+/−1% non-volatile, and 132.6 g of $TiO_2$ pigment slurry having 50+/−1% non-volatile. The active pigment to polymeric binder ratio was 20%. The $TiO_2$ pigment in the slurry was described by the manufacturer as having a first inner layer of zirconia and alumina and a second outer layer of polyether polyol. The $TiO_2$ pigment and the polymer particles remain uniformly dispersed in the concentrate.

EXAMPLE 2

A 6% non-volatile, 20 ml Fe titration, off-white autodeposition coating bath was formulated using the composition of Example 1, as follows:

In a 1.5 liter container, the following were combined:
5.20 g HF
1.70 g Iron powder
3.62 g Hydrogen peroxide 35%
Distilled water to make 1.0 liter The material was mixed for several minutes. 257.1 g of the composition of Example 1 was added to the 1.5 liter container slowly with agitation. Finally, sufficient distilled water to make 1.5 liters was added. The bath was mixed for one hour and bath parameters were adjusted to the following parameters under continuous agitation:

| | |
|---|---|
| Redox Value | 275-400 mV |
| Lineguard 101 meter reading | 100-700 microamperes |
| Total % non-volatile | 1-10% |
| Wet coating solids | 20-50% |
| Starter titration | 10-40 ml |
| Bath temperature | 20-25° F. |
| Conductivity | 1,200-10,000 microsiemens |

After the off-white bath was prepared and parameters optimized, metallic panels were treated according to the following method:

A. Cleaning with alkaline cleaner—2 minutes
B. Warm water rinsing—1 minute
C. Deionized water rinsing—1 minute
D. Contacting with the off-white autodeposition processing bath of Example 2—2 minutes
F. Water rinsing—1 minute
G. Treating with AUTOPHORETIC® Reaction Rinse E2 (commercially available from Henkel Corporation)—1 minute
H. Oven curing at 53° C. for 7 minutes and at 185° C. for 40 minutes.

The resulting coated panels were slightly off-white in color, were uniform in color and exhibited good hiding power.

EXAMPLE 3

A 35% non-volatile, grey autodeposition coating composition concentrate was formulated as follows:

To a one-liter flask, were added 211.14 g of deionized water, 5.63 g of anionic surfactant having 20% non-volatile (active), 3.38 g of black pigment slurry having 30% non-volatile, 786.4 g of anionically modified polymer emulsion having 42+1-1% non-volatile, and 132.6 g of the $TiO_2$ pigment slurry of Example 1 having 50+/−1% non-volatile. The active pigment to polymeric binder ratio was 20%.

A 6% non-volatile, 20 ml Fe titration, gray autodeposition coating bath was formulated using the composition of Example 3, according to the procedure of Example 2.

The bath was mixed for one hour and bath parameters were adjusted to the parameters of Example 2 under continuous agitation.

After the gray bath was prepared and parameters optimized, metallic panels were treated according to the method of Example 2. The resulting coated panels were gray in color, were uniform in color and exhibited good hiding power.

EXAMPLE 4

Gray autodeposition baths were formulated according to Example 3, at various pigment to binder ratios. The ratios varied from 5:95 pigment: binder to 50:50 pigment: binder. The physical and corrosion performance at various ratios are shown in Table 1, below:

TABLE 1

| Pigment:Binder ratio | Cross hatch adhesion ASTM D 3359-02 | Reverse Impact (in. lb.) | Solvent Resistance M.E.K. Double Rubs | Pencil Hardness ASTM D3363-00 | Neutral Salt Spray (Total mm scribe creep at 504 hours) ASTM B117 | Stability |
|---|---|---|---|---|---|---|
| 5:95 | 5B | >80 | >200 | >3H | 1.6 | Stable |
| 10:90 | 5B | >80 | >200 | >3H | 1.5 | Stable |
| 17:87 | 5B | >80 | >200 | >3H | 2.9 | Stable |
| 30:70 | 5B | >80 | >200 | >3H | 1.2 | Stable |
| 40:60 | 5B | >80 | >200 | >3H | 1.4 | Stable |
| 50:50 | 5B | >80 | >200 | >3H | Not tested | *Not stable |

*Not stable means that the $TiO_2$ was not deposited and settled out of the autodeposition bath.

EXAMPLE 5

Comparative Example

A 35% non-volatile, gray autodeposition coating composition concentrate was formulated as follows:

To 1.5 liter flask, were added 92.7 g of deionized water, 5.63 g of anionic surfactant having 20% non-volatile (active), 3.38 g of black pigment slurry having 30% non-volatile, 904.89 g of anionically modified polymer emulsion having 42+/−1% non-volatile, and 132.6 g of $TiO_2$ pigment slurry of Example 1 having 50+/−1% non-volatile. The active pigment to polymeric binder ratio was 20%.

The surfactant used to make the emulsion in this example was changed relative to the previous examples. The surfactant used had similar ionic end groups to the surfactant of Examples 1-4, but the number moles of alkoxylation was reduced making the surfactant of Example 5 less hydrophilic.

A 6% non-volatile, 20 ml Fe titration, gray autodeposition coating bath was formulated using the composition of Example 5, according to the procedure of Example 2.

The bath was mixed for one hour and bath parameters were adjusted to the parameters of Example 2 under continuous agitation. After the gray bath was prepared and parameters optimized, metallic panels were treated according to the method of Example 2. The resulting coated panels were brown in color indicating no pigment deposition. After aging of the autodeposition bath for a few days, the pigment was separated from the bath or destabilized. Changing bath hydrophobic/hydrophilic equilibrium between emulsion and pigment particles caused un-equal partitioning of the surfactant between the particles, depriving the pigment particles from surfactant, and therefore destabilization of the pigment particles occurred.

We claim:

1. A method of depositing a white to off-white or gray autodeposition coating on an active metal substrate surface comprising:
    contacting an active metal substrate surface for 0.5 to 10 minutes, with an autodeposition bath composition to form a white to off-white or gray initially adherent coating on said surface; said autodeposition bath composition comprising:
        a. an aqueous solution of an autodeposition accelerator comprising an acid, in an amount such that the composition has a pH of about 1.0 to about 4.0, and at least one oxidizing agent;
        b. particles of a coating-forming polymeric material dispersed throughout the composition;
        c. a component of non-black solid pigment particles, stabilized against said acid, dispersed throughout the composition;
        d. an emulsifying component comprising an anionic surfactant; and,
    optionally,
        e. black pigment and/or finely divided solids suitable as fillers in the coatings to be formed from the composition;
    wherein relative hydrophobicity/hydrophilicity of the non-black solid pigment particles and hydrophobicity/hydrophilicity of the particles of a coating-forming polymeric material are such that the non-black solid pigment particles remain dispersed in the bath in absence of active metal and deposit adherently on the active metal substrate in said contacting step, said composition being effective to chemically attack, in the absence of an external electrical potential, the active metal surface immersed therein to dissolve therefrom metal to release ions of said metal and sufficient to cause said polymeric material and said non-black solid pigment particles to deposit on the active metal surface as the initially adherent coating which increases in weight or thickness the longer the time said surface is immersed in said composition;
    rinsing said initially adherent coating with a rinse comprising water;
    optionally, drying said initially adherent coating; and
    curing said initially adherent coating to form a cured, white to off-white or gray coating.

2. The method according to claim 1 wherein said acid is hydrofluoric and said non-black solid pigment particles comprise a titanium dioxide core, a first coating of an oxide different from titanium dioxide and a second coating of an organic material.

3. The method of depositing a white to off-white or gray autodeposition coating according to claim 2 wherein said first coating of an oxide comprises oxides that are substantially insoluble in said acid.

4. The method of depositing a white to off-white or gray autodeposition coating according to claim 2 wherein said first coating of an oxide comprises oxides selected from $Al_2O_3$, $ZrO_2$ and mixtures thereof.

5. The method of depositing a white to off-white or gray autodeposition coating according to claim 4 wherein said composition comprises hydrolysis products of $Al_2O_3$ and/or $ZrO_2$.

6. The method of depositing a white to off-white or gray autodeposition coating according to claim 2 wherein said second coating of an organic material comprises an anionic dispersing additive, a cationic dispersing additives or a non-ionic dispersing additive.

7. The method of depositing a white to off-white or gray autodeposition coating according to claim 2 wherein said second coating of an organic material comprises at least one of polyphosphates, epichlorohydrin resins, dicyandiamide resins, polyols and polyesters.

8. The method of depositing a white to off-white or gray autodeposition coating according to claim 1 having a weight ratio of the non-black solid pigment particles to the polymeric material that ranges from 1-49% by weight.

9. The method of depositing a white to off-white or gray autodeposition coating according to claim 1 having a weight ratio of the non-black solid pigment particles to the polymeric material that ranges from 5:95 to 40:60.

10. The method of depositing a white to off-white or gray autodeposition coating according to claim 1 wherein said anionic surfactant is selected from surfactants having at least one sulfate, sulphonate, phosphate, or phosphonate functional group.

11. The method of depositing a white to off-white or gray autodeposition coating according to claim 1 wherein said anionic surfactant maintains dispersion of the particles of a coating-forming polymeric material and the component of non-black solid pigment particles, such that said polymeric material and said pigment particles deposit on the active metal surface as the initially adherent coating.

12. The method of depositing a white to off-white or gray autodeposition coating according to claim 1 wherein component c) comprises modified $TiO_2$ particles provided as an aqueous slurry.

13. The method of making a white to off-white or gray autodeposition coating bath of claim 12 wherein the aqueous slurry is modified with the anionic surfactant of d).

14. The method of depositing a white to off-white or gray autodeposition coating according to claim 1 wherein said polymeric material is selected from the group consisting of styrene-butadiene, acrylonitrile-butadiene, polyethylene, acrylic, tetrafluoroethylene, polyvinyl chloride, urethane resins, styrene-acrylic, epoxy, and epoxy-acrylic materials.

15. The method of depositing a white to off-white or gray autodeposition coating according to claim 1 wherein said acid comprises hydrofluoric acid and the coating-forming polymeric material is selected from epoxy or epoxy-acrylic material.

16. The method of depositing a white to off-white or gray autodeposition coating according to claim 1 wherein said non-black solid pigment particles comprise a titanium dioxide core, a first coating of an oxide comprising zirconia and a second coating of an organic material.

17. The method of depositing a white to off-white or gray autodeposition coating on an active metal substrate surface of claim 1, further comprising, prior to the contacting step, a step of:
forming a mixture comprising:
a. water;
b. particles of a coating-forming polymeric material;
c. a component of non-black solid pigment particles, stabilized against said acid;
d. a surfactant package comprising an emulsifying component comprising an anionic surfactant, and optionally a second stabilizing surfactant different from the emulsifying component;
e. an acid, in an amount such that the coating bath has a pH of about 1.0 to about 4.0, and
f. at least one oxidizing agent; and,
optionally,
g. black pigment and/or finely divided solids suitable as fillers in the coatings to be formed from the composition;
wherein b.), c.) and d.) are selected such that partitioning of d.) between b.) and c.) provides an equilibrium condition such that dispersion of polymer particles and pigment particles is maintained; said composition being effective to chemically attack, in the absence of an external electrical potential, the active metal surface immersed therein to dissolve therefrom metal to release ions of said metal and sufficient to cause said polymeric material and said non-black solid pigment particles to deposit on the active metal surface as the initially adherent coating which increases in weight or thickness the longer the time said surface is immersed in said composition.

18. The method of depositing a white to off-white or gray autodeposition coating on an active metal substrate surface of claim 17 wherein component c) comprises modified $TiO_2$ particles provided as an aqueous slurry.

19. The method of depositing a white to off-white or gray autodeposition coating on an active metal substrate surface of claim 18 wherein the aqueous slurry is modified with the anionic surfactant of d).

20. The method of depositing a white to off-white or gray autodeposition coating on an active metal substrate surface of claim 17 wherein said acid comprises hydrofluoric acid and the coating-forming polymeric material is selected from epoxy or epoxy-acrylic material.

21. The method of depositing a white to off-white or gray autodeposition coating on an active metal substrate surface of claim 17 wherein said non-black solid pigment particles comprise a titanium dioxide core, a first coating of an oxide comprising zirconia and a second coating of an organic material.

22. A method of depositing a white to off-white or gray autodeposition coating on an active metal substrate surface comprising:
forming an autodeposition bath comprising:
a. water;
b. particles of a coating-forming polymeric material;
c. a component of non-black solid pigment particles, stabilized against HF, the particles comprising a titanium dioxide core, a first coating of an oxide different from titanium dioxide and a second coating of an organic material comprising at least one of polyphosphates, epichlorohydrin resins, dicyandiamide resins and polyols;
d. a surfactant package comprising an emulsifying component comprising an anionic surfactant, and optionally a second stabilizing surfactant different from the emulsifying component;
e. HF, and
f. at least one oxidizing agent; and,
optionally,
g. black pigment and/or finely divided solids suitable as fillers in the coatings to be formed from the composition;
wherein b.), c.) and d.) are selected such that partitioning of d.) between b.) and c.) provides an equilibrium condition such that dispersion of polymer particles and pigment particles is maintained; said composition being effective to chemically attack, in the absence of an external electrical potential, the active metal surface immersed therein to dissolve therefrom metal to release ions of said metal and sufficient to cause said polymeric material and said non-black solid pigment particles to deposit on the active metal surface as the initially adherent coating which increases in weight or thickness the longer the time said surface is immersed in said composition;
contacting an active metal substrate surface for 0.5 to 10 minutes, with said autodeposition bath composition to form a white to off-white or gray initially adherent coating on said surface;
rinsing said initially adherent coating with a rinse comprising water;
optionally, drying said initially adherent coating; and
curing said initially adherent coating to form a cured, white to off-white or gray coating.

23. The method of depositing a white to off-white or gray autodeposition coating on an active metal substrate surface of claim 22 wherein relative hydrophobicity/hydrophilicity of the non-black solid pigment particles and hydrophobicity/hydrophilicity of the particles of a coating-forming polymeric material are such that the non-black solid pigment particles remain dispersed in the bath and deposit adherently on the active metal substrate.

* * * * *

UNITED STATES PATENT AND TRADEMARK OFFICE
CERTIFICATE OF CORRECTION

PATENT NO. : 8,871,309 B2
APPLICATION NO. : 13/465409
DATED : October 28, 2014
INVENTOR(S) : Omar Lufti Abu-Shanab et al.

Page 1 of 1

It is certified that error appears in the above-identified patent and that said Letters Patent is hereby corrected as shown below:

In the Specification

Column 10, Line 9: Change "42+1-1%" to -- 42+/-1% --.

Signed and Sealed this
Twenty-third Day of May, 2017

Michelle K. Lee
*Director of the United States Patent and Trademark Office*